Patented Mar. 6, 1951

2,543,792

UNITED STATES PATENT OFFICE 2,543,792

PURIFICATION OF SILVER NITRATE SOLUTIONS

Martin Marasco, New Brunswick, N. J., Louis J. Conrad, Baton Rouge, La., and Jerome A. Moede, New Brunswick, N. J., assignors to E. I. du Pont de Nemours & Company, Wilmington, Del., a corporation of Delaware No Drawing. Application November 2, 1949, Serial No. 125,166

4 Claims. (Cl. 23—102)

This invention relates to the purification of silver nitrate solutions. More particularly it relates to the removal of contaminating metal ions from aqueous solutions of silver nitrate.

Photographic silver halide emulsions are generally made by precipitating silver halides in an aqueous colloid solution. Aqueous silver nitrate solutions are used as the source of the silver ions. The silver nitrate solutions should be very pure and free from other metal salts in order to obtain optimum photographic properties. The prior art methods for the preparation of such solutions are quite time consuming and tedious and require a plurality of crystallizations.

An object of this invention is to provide an improved process for preparing silver nitrate solutions having a high degree of purity. Another object is to provide a simplified process for preparing silver nitrate solutions of good photographic quality. A further object is to provide such a process which is economical and can be carried out on a relatively large scale. Still other objects will be apparent from the following description of the invention.

The process of purifying aqueous silver nitrate solutions of this invention consists of three main steps, (1) passing the aqueous silver nitrate solution into contact with elemental carbon, (2) passing the resulting solution into contact with activated alumina, and (3) treating the resulting mixture with silver oxide. The foreign metal ions are removed and a silver nitrate solution of good photographic quality recovered.

The first step may be advantageously accomplished by passing an aqueous solution of silver nitrate of 3 to 8 normality which contains other heavy metal salts as impurities through a column packed with particles or pieces of elemental carbon. The amount of carbon should be from 0.02 to 0.10% by weight of the total amount by weight of the silver nitrate in the solution to be purified. It has been determined that this first treatment removes the "platinum metals" gold, bismuth and mercury ions. The carbon may be carbon black, made from activated wood charcoal or from other sources of elemental carbon and preferably is in fine granular form having particle size range of $10^{-2}$ to 1 micron depending on the degree of activation of the carbon.

The aqueous silver nitrate solution which is recovered from the base of the column is then passed through a similar column, but which is packed with small pieces or particles of activated alumina. In general, there should be from 3 to 10% by weight of activated alumina based on the total amount by weight of silver nitrate in the original aqueous solution. The activated alumina is also preferably in fine granular form having an average particle size of 28 to 100 mesh. It has been determined that this second step removes substantially all of the metal ion impurities which remain in the solution.

The aqueous silver nitrate solution recovered from the second step of the present process contains fine particles of alumina in suspension which are removed so that they will not cause spots in the finished films or papers. The particles may contain adsorbed metal impurities on their surfaces and this is, of course, disadvantageous. The removal of the particles can be effectively accomplished by filtering the solution through a stratum or layer of silver oxide particles. The particles may be disposed on top of a filter or on fritted glass or they may be contained in an inert porous material, e. g., cardboard impregnated with silver oxide. The filter material can be impregnated with silver oxide by first saturating it with 1 N silver nitrate, then passing 1 N sodium hydroxide through it, and finally washing it with distilled water. To prevent the silver nitrate solution from dissolving the silver oxide impregnated in the filter, the pH of the solution is raised by treating it with silver oxide before it reaches the filter. This may be done by stirring the solution with an excess of silver oxide or by passing it through alumina coated with silver oxide. Alumina can be coated with silver oxide by passing sodium hydroxide solution through it until the pH of the filtrate is greater than 11 and then passing silver nitrate solution through it to precipitate silver oxide on the grains. The material is then washed with distilled water to remove sodium ions and other foreign ions.

After the alumina dust has been removed from the purified silver nitrate solution the pH is adjusted to 3.0–3.5 with dilute nitric acid and is ready for use in emulsion making.

The aqueous silver nitrate solution which is recovered from the novel three-step process just described is of such a high degree of purity that it can be used directly for the precipitation of light-sensitive silver halides in a photographic colloid emulsion. It is not necessary to resort to a costly crystallization procedure.

Silver nitrate solutions of the type purified by this invention are generally made by the treatment of silver bullion, e. g., 999.7 fine with nitric acid. Since technical and distilled reagent nitric acid contain small amounts of copper and lead, ions of these metals are introduced into the system. Such metal impurities are, however, removed with other impurities found in the bullion by the novel three-step process of this invention.

The invention will be further illustrated but is not intended to be limited by the following procedure and examples.

PROCEDURE FOR MAKING SILVER NITRATE SOLUTION

Silver bullion in the form of pellets approximately ⅛ of an inch in diameter and in various short lengths were added with distilled water to a nitration vessel at 20° C. Commercial nitric acid containing approximately 0.07 part of copper and 0.25 part of lead per million was added and a vigorous reaction began immediately due to the heat generated on diluting the acid. The temperature rapidly rose from 20 to 43° C. The vigorous reaction continued for 15 minutes with the temperature holding constantly at 43° C. When the reaction subsided the solution was heated to the boil and boiled until the resulting solution (approximately 6 N) was pH 3. This required approximately 20 minutes. The ingredients were used in the amounts indicated in the following table:

| Material | Vol. | Wt. | Moles | Mol Ratio | Remarks |
|---|---|---|---|---|---|
| 99.97% Ag bullion | | G. 64.0 | 0.60 | 1.5 | 100% excess. |
| Commercial HNO₃ (14.8 N) | 27 | 25.2 | 0.40 | 1.0 | |
| Distilled H₂O | 23 | 23.0 | 1.28 | 3.2 | |

EXAMPLE I

Fifty liters of an aqueous solution containing 35 kilograms of silver nitrate was passed by suction, in one step, through 30 grams of activated wood charcoal, 1400 grams of activated alumina, packed in a 60 mm. diameter column, and a filter containing 100 grams of granular activated alumina particles coated with silver oxide on a 90 mm. fritted glass disc impregnated with silver oxide. The silver nitrate was prepared from 99.97% silver bullion and technical grade nitric acid by the above procedure. The carbon had an average particle size of 0.5–1.0 micron, the alumina was 28–48 mesh and the fritted glass had a maximum pore size of 14 microns. The temperature of the solution was 20–35° C. and the suction was regulated so that the rate of flow was approximately 130 cc./min. After purification the pH was adjusted to 3.0 with 1 N nitric acid and the resulting solution which was of high purity used directly to prepare photographic emulsions.

Data from the spectrographic analysis of the silver nitrate solution obtained by the above process is summarized below:

*Metal impurity grams per 10⁶ grams silver nitrate*

| Pd | Au | Cu | Pb | Bi | Pt | Hg | Ir | Ru | Rn | Na |
|---|---|---|---|---|---|---|---|---|---|---|
| less than 0.15 | less than 0.5 | less than 0.5 | less than 0.5 | less than 0.01 | less than 1.0 | less than 0.3 | less than 0.02 | less than 1.0 | less than 0.3 | 60 |

Summarized below are the results of sensitometric tests on positive type gelatino iodo-bromide emulsions having one mole per cent iodide. The control emulsion was prepared from a C. P. grade of silver nitrate commonly used in the manufacture of photographic emulsion and manufactured by the conventional method of repeated recrystallization. The films tested were developed at 68° F. for 3½ minutes in a developer consisting of 0.46 gram Metol[1], 3.4 grams hydroquinone, 28 grams sodium sulfite, 10 grams of the mono-hydrate of sodium carbonate, and 0.44 gram of potassium bromide all diluted up to one liter:

| | Test Emulsion | | | Control Emulsion | | |
|---|---|---|---|---|---|---|
| | Rel. Speed | H & D Gamma | Fog | Rel. Speed | H & D Gamma | Fog |
| Fresh | 78 | 3.27 | .02 | 76 | 3.31 | .01 |
| After 7 days at R. T. | 67 | 3.00 | .01 | 64 | 2.98 | .01 |
| After 40 hrs. at 120° F. | 71 | 2.93 | .03 | 69 | 2.88 | .03 |

EXAMPLE II

Twelve and six-tenths liters of an aqueous solution containing eleven kilograms of silver nitrate prepared from 99.97% silver bullion and C. P. nitric acid was passed by suction, in one step, through 10 grams of carbon black, a 60 mm. diameter column packed with 1300 grams of activated alumina and having a top layer of 100 grams of activated alumina coated with silver oxide, and a filter having a 90 mm. fritted glass disc impregnated with silver oxide. The carbon black had an average particle size of approximately 10 millimicrons, the alumina was 28–48 mesh, and the fritted glass had a maximum pore size of 14 microns. The temperature of the solution was 20–35° C. and the suction was regulated so that the rate of flow was approximately 180 cc./min. The pH of the resulting solution was adjusted to 3.0 with 1 N nitric acid. It had less of the following metal impurities than silver nitrate purified by recrystallization. The data from spectrographic analysis is given below:

*Metal impurity grams per 10⁶ grams silver nitrate*

| Pd | Au | Cu | Pb | Bi | Pt | Hg | Ir | Rh | Ru |
|---|---|---|---|---|---|---|---|---|---|
| less than 0.07 | less than 0.25 | less than 0.5 | less than 0.5 | less than 0.015 | less than 0.5 | less than 0.15 | less than 0.02 | less than 0.5 | less than 0.15 |

The silver nitrate solution obtained was used to make a high speed negative iodo-bromide emulsion of good quality containing 3.4 mole per cent iodide. The control emulsion was manufactured from silver nitrate of the type used in Example I. Given below are the data obtained after developing the films tested for nine minutes at 68° F. in an aqueous developer containing 2.5

---
[1] N-methyl-p-aminophenol sulfate.

grams N-methyl-p-aminophenol sulfate, 750 grams sodium sulfite, 3.0 grams hydroquinone and 5.0 grams borax all diluted with water to one liter.

| Test Emulsion | | | Control Emulsion | | |
|---|---|---|---|---|---|
| Rel. Speed | H & D Gamma | Fog | Rel. Speed | H & D Gamma | Fog |
| 1.00 | 1.16 | 0.08 | 1.00 | 1.18 | 0.10 |

The yield of purified silver nitrate obtained in the foregoing example was close to theoretical. The silver retained by the carbon and alumina can be reclaimed as the metal or as a silver halide. The yield obtained by the present process is considerably higher than that obtained by crystallization methods of purifying commercial silver nitrate solutions which makes it decidedly advantageous.

A further advantage of the present invention is that it is simple and effective. It can be carried out in relatively inexpensive equipment. The concentration of metal impurities in the final solution is markedly lower than that present in aqueous silver nitrate solutions made by conventional recrystallization procedures. The concentration of metal impurities in the final silver nitrate solutions is below that which confers undesirable properties on photographic silver halide emulsions.

As many widely different embodiments of this invention can be made without departing from the spirit and scope thereof, it is to be understood that the invention is not to be limited except as defined by the claims.

What is claimed is:

1. A process of purifying an aqueous solution of silver nitrate containing small amounts of heavy and noble metal impurities which comprises bringing the solution into intimate contact with carbon particles, bringing the resulting solution into intimate contact with activated alumina, bringing the resulting solution into intimate contact with silver oxide and separating the aqueous solution of silver nitrate from the silver oxide.

2. In a process of purifying an aqueous solution of silver nitrate containing small amounts of heavy and noble metal impurities which comprises bringing the solution into contact with finely divided particles of activated alumina, bringing the resulting solution into contact with silver oxide and separating the resulting solution from the silver oxide.

3. A process of purifying an aqueous solution of silver nitrate containing small amounts of heavy and noble metal impurities which comprises bringing the solution into contact with finely divided particles of carbon, bringing the resulting solution into contact with from 3 to 10% by weight based on the silver nitrate of finely divided particles of activated alumina for a period of 1 to 5 minutes, passing the resulting solution in contact with finely divided particles of silver oxide and separating the resulting solution from the latter particles.

4. A process of purifying an aqueous solution of silver nitrate containing small amounts of heavy and noble metal impurities which comprises passing said solution through a stratum of carbon particles, passing the resulting solution through a column of particles of activated alumina, passing the resulting solution through a stratum of silver oxide particles and separating the resulting solution from the silver oxide particles.

MARTIN MARASCO.
LOUIS J. CONRAD.
JEROME A. MOEDE.

No references cited.